US007781925B2

(12) United States Patent
Lacaze

(10) Patent No.: US 7,781,925 B2
(45) Date of Patent: Aug. 24, 2010

(54) ELECTRICAL MACHINE WITH ELECTRONIC POWER UNIT FOR CONVERSION

(75) Inventor: Alain Lacaze, Essert (FR)

(73) Assignee: ALSTOM Technology Ltd., Baden (CH)

( * ) Notice: Subject to any disclaimer, the term of this patent is extended or adjusted under 35 U.S.C. 154(b) by 334 days.

(21) Appl. No.: 12/048,443

(22) Filed: Mar. 14, 2008

(65) Prior Publication Data

US 2008/0231127 A1 Sep. 25, 2008

(30) Foreign Application Priority Data

Mar. 20, 2007 (EP) ................... 07104474

(51) Int. Cl.
H02K 11/00 (2006.01)
H02M 5/00 (2006.01)
H02M 5/32 (2006.01)

(52) U.S. Cl. .................. 310/71; 310/68 R; 310/150; 310/68 D; 310/89; 363/148; 363/150

(58) Field of Classification Search ............... 310/68 R, 310/68 D, 71, 89; 363/148, 150; H02K 11/00; H02M 5/00, 5/09
See application file for complete search history.

(56) References Cited

U.S. PATENT DOCUMENTS

| 5,608,237 | A * | 3/1997 | Aizawa et al. | ............... 257/132 |
| 5,793,064 | A * | 8/1998 | Li | ................ 257/119 |
| 7,460,377 | B2 * | 12/2008 | Lacaze | ........................ 363/10 |

| 2002/0093840 | A1 * | 7/2002 | Lacaze et al. | ............... 363/152 |
| 2002/0174798 | A1 * | 11/2002 | Kumar | ........................ 105/50 |
| 2003/0233959 | A1 * | 12/2003 | Kumar | ................... 105/26.05 |
| 2005/0235865 | A1 * | 10/2005 | Kumar | ........................ 105/61 |
| 2006/0012320 | A1 * | 1/2006 | Kumar | ........................ 318/376 |

FOREIGN PATENT DOCUMENTS

DE 10051222 4/2002

(Continued)

OTHER PUBLICATIONS

Thomas, K. M., et al., "The Bidirectional Control Thyristor (BCT)," ABB Doc. No. 5SYA 2006, Feb. 2, 1999, ABB Semiconductors AG, Feb. 1999, pp. 1-10.

(Continued)

Primary Examiner—Quyen Leung
Assistant Examiner—John K Kim
(74) Attorney, Agent, or Firm—Cermak Nakajima LLP; Adam J. Cermak

(57) ABSTRACT

A matrix converter for the conversion of a polyphase alternating current into a desired alternating output current in which m phases of the polyphase alternating current are converted into alternating output current with n (n<m) phases of a load by a multiple number of controllable bidirectional switches. The converter includes at least one stage, and in that at least one stage of the converter each phase of the polyphase alternating current is controlled by a controllable bidirectional switch. The at least one stage of the converter is formed by a two-dimensional array of stage stacks of switching elements which stage stacks are arranged substantially parallel to each other along a stack direction perpendicular to the plane of the matrix converter, and wherein the input of the stage stacks is provided by bus bars located on one side of the stage stacks.

24 Claims, 12 Drawing Sheets

FOREIGN PATENT DOCUMENTS

| | | |
|---|---|---|
| DE | 10310307 | 10/2003 |
| EP | 1199794 | 4/2002 |
| WO | WO00/38306 | 6/2000 |
| WO | WO2006/103155 | 10/2006 |
| WO | WO2006/103159 | 10/2006 |

OTHER PUBLICATIONS

Gaudreau, M. P. J., et al., "A Solid-State Switch for 13.8kV Power Distribution," [Online] Retrieved from the internet: http://web.archive.org/web/20061016044310/http://www.divtecs.com/papers/PDF/PES_2001_138switch.pdf>, 2006, pp. 1-10.

Search Report for EP Patent App. No. 07104474.7 (Nov. 12, 2007).

* cited by examiner

ELECTRICAL MACHINE WITH ELECTRONIC POWER UNIT FOR CONVERSION

This application claims priority under 35 U.S.C. §119 to European patent application no. 07104474.7, filed 20 Mar. 2007, the entirety of which is incorporated by reference herein.

BACKGROUND

1. Field of Endeavor

The disclosure pertains to an electrical machine having a stator and a rotor rotatably and coaxially mounted therein, preferably a generator, and a housing within which the stator and the rotor are substantially located, and an electronic power unit for conversion of polyphase alternating current.

2. Brief Description of the Related Art

In power generation, at a specified output, an increase of the rotary speed of a turbine is associated with a decrease in size and costs. Efficiency, too, can be improved. So far, power generation turbines up to 70 MW are connected to generators by way of gearing arrangements, so as to allow operation at higher turbine rotary speeds. As the output increases, the use of gearing arrangements becomes increasingly difficult due to reliability reasons. In such cases, the turbine is operated at synchronous speed of the generator.

The use of static frequency converters (power electronics) represents an alternative providing many advantages, such as reduced costs of the generator in agreement with a constant product of volume and rotational speed, adjustable speed which allows restoration of the partial-load efficiency of the turbine, substantial reduction in noise, clean (oil-free) cooling, etc.

Both in the case of power generation and in the case of drives, a reduction in losses of the static frequency converters would bring about substantial cost savings. A reduction of the losses would above all have a bearing on investment costs because cooling accounts for a substantial part of the total costs of the converter.

Static frequency converters exist both with indirect AC/DC/AC conversion and with direct AC/AC conversion.

The indirect conversion (AC/DC/AC) is caused by generating a direct current or a direct voltage from the three-phase source (grid in the case of motors; generator in the case of power generation). Subsequently, the direct current or the direct voltage is converted back to an alternating current by means of an inverter. An inductance (current source converter) or a capacitor bank (voltage source converter) are switched into the dc link so as to enable the working principle.

Today's large indirect converters are of the current source type and make use of thyristors. If natural commutation of the thyristors is possible, the losses in the converter are reduced. Voltage source converters use GTOs with their inherent high conduction losses, as well as IGBTs or IGCTs. The power capability of the individual components is less than that of thyristors; consequently, a larger number of components are required for a specified voltage and a specified current. Voltage source converters can benefit from the use of pulse-width modulation techniques which improve the shape of the current curves and reduce the harmonics. The higher the switching frequencies, the better, except with regard to losses and dielectric fatigue. The current can largely be produced sine-shaped so that a derating of power of the electrical machine is avoided.

Direct conversion (AC/AC) is, for example, possible by means of a so-called cyclo-converter. Direct conversion provides significant advantages from the point of view of the electrical machine, because the current is more or less sine-shaped rather than chopped direct current. It reduces the losses which occur additionally in the electrical machine and it also prevents pulsating torques.

However, the use of 3-phase cyclo-converters limits the achievable frequency range to 0-⅓ of the input frequency. A 3-phase cyclo-converter is made of 3 single phase cyclo-converters, each processing ⅓ of the power in balanced operation. Exceeding the ⅓ limit in frequency ratio results in a strongly unbalanced operation, in which case each single phase cyclo-converter should be designed for more than ⅓ of the full power. The overdimensioning can be up to a factor of 3 in power rating.

Another possibility of direct conversion is provided by a so-called matrix converter in which each phase of a multi-phase source (generator or grid) is connected or connectable with each phase of a multi-phase load (grid, passive load, motors, etc.) by a bi-directional switch. The switches include an adequate number of thyristors to withstand the differential voltage between the phases, and the phase currents, and to allow current reversal. They can be regarded as truly bi-directional components with the options of jointly using additional wiring such as snubbers or the gate unit power supplies for the drive pulses for the antiparallel components.

The switches are arranged in an (m×n)-matrix at m phases of the source and n phases of the load. This provides the option of establishing any desired connections between the input phases and the output phases; however, at the same time, it has a disadvantage in that certain switching states of the matrix must be excluded since otherwise, for example, a short circuit would result. Furthermore it is desirable to carry out commutation from one phase to another phase such that the lowest possible switching losses result.

It is, e.g., possible to operate a matrix converter in a way that only natural commutations are being used. This can be achieved by only allowing the switching over from a selected connected phase of the generator to a selected not-connected phase of the generator only if certain conditions are met. Such a matrix converter as well as a mode of its operation has been disclosed in DE-A-100 51 222 as well as in the corresponding European application EP-A-1 199 794. While being of high efficiency and versatility, the common concept of a matrix converter and its mode of operation generally suffers from weaknesses for certain applications with respect to harmonic distortion and with respect to possible frequency ratios.

A different proposal had been made in the context of EP-A-0 707 372, proposing a frequency matching device to be used for the polyphase output of a generator, wherein the frequency matching device or, rather, its components, are directly located on the end windings of the stator of the generator. The frequency matching device is located in the housing of the generator and is cooled by the same cooling system as the parts of the generator which have to be cooled.

A further improvement in respect of cooling of such power electronic devices, forming part of the electrical machine, is proposed in DE-A-103 10 307. In order to have an increased flexibility in respect of cooling, this document proposes to locate the power electronic device in the housing of the generator but to provide a separate and independent cooling system for the power electronic device, which may for example be a converter.

SUMMARY

One of numerous aspects of the present invention therefore involves providing an improved matrix converter for the conversion of a polyphase alternating current into a desired alternating output current. This for a case, in which m phases of the polyphase alternating current are converted into alternating output current with n (n<m) phases of a load by a multiple number of controllable bidirectional switches, and in which the converter comprises at least one stage in which each phase of the polyphase alternating current is controlled by a controllable bidirectional switch.

Specifically, the matrix converter is a matrix converter for the conversion of a polyphase alternating current, wherein phases of the polyphase alternating current are typically with m between 12-60, preferably in the range of 24-36, and these are converted into alternating output current with n (n<m) phases wherein n is typically 3 or 6.

A particularly convenient arrangement of elements in such a matrix converter can be achieved, if the at least one stage of the converter is formed by a two-dimensional array of stage stacks of switching elements, which stage stacks are arranged substantially parallel to each other along a stack direction perpendicular to the plane of the matrix converter, and if the input of the stage stacks is provided by bus bars located on one side of the stage stacks and substantially in a plane parallel to the plane of the matrix converter, and the output of the stage stacks is collected by further (grid) bus bars located on the other side of the stage stacks and substantially in a plane parallel to the plane of the matrix converter. This way the individual elements of a matrix converter are almost ideally arranged in respect of possible cooling, in respect of as short as possible connections between elements and as a whole, and in respect of modular maintenance possibilities etc.

Typically in such a matrix converter, each bidirectional switch comprises at least two branches with anti-parallel unidirectional switching elements (which can be combined into single elements, e.g., BCT's; see further below) wherein preferably in each branch at least two switching elements are provided in series. The polyphase alternating current can be provided by a generator for the production of electrical power from mechanical power, and the polyphase alternating current has more than three phases. The windings of the stator giving rise to the phases of the polyphase alternating current can be delta connected. The number of phases (m) of the polyphase alternating current may go up to the number of stator slots of a 2-pole generator. This number can be any integer fractional of the slot number.

According to a first embodiment of the invention, the matrix converter is additionally characterised in that the bus bars are arranged substantially orthogonal to the grid bus bars. The perpendicular arrangement of the two sets of bus bars allows a surprisingly simple and efficient connectivity and an ideal spatial arrangement of the individual elements of the matrix converter. Typically, there is provided m/n bus bars and 2n grid bus bars.

The converter may comprise two stages, and in at least one stage of the converter each phase of the polyphase alternating current is controlled by a controllable bidirectional switch. It is possible to have a setup, in which the first stage of the converter is integrated into the stator generator and only to have a further stage in a cubicle (see further below, e.g., just the array of grid stacks). Preferably, the part of the matrix converter, which is contained in the stator, is located in the stream of cooling fluid that is used to cool the generator.

Typically, the bidirectional switches are controlled by a control unit, selectably connecting m inputs with n outputs, wherein first means for determining the signs of the currents in the inputs, and second means for determining the signs of the voltages between the inputs are provided, and wherein the first and second means are in active connection with the control system. The bidirectional switches are then connected to the control system via a signal line by way of which information concerning the switch state of the switches is transmitted to the control system.

According to a further embodiment of the invention, the converter thus comprises at least two stages. In this case, in at least one stage of the converter each phase of the polyphase alternating current is controlled by a controllable bidirectional switch, wherein the stage of the converter in which each phase of the polyphase alternating current is controlled by a controllable bidirectional switch is the so-called first stage (also called the generator stage) and directly connected to a generator and wherein in at least one so-called grid stage of the converter there is provided m/n groups of controllable bidirectional switches, each group comprising n parallel bidirectional switches individually connected to each of the phases of the alternating output current. Specifically, the grid stage of the converter is the last stage of the converter and directly connected to a transformer or a load. In the context of this topology, specific reference is made to the application with the number PCT/EP2006/060617, the content of which is, in respect of the topology of the matrix converter with several stages, explicitly incorporated by reference herein.

In this case, the grid stage of the converter is formed by a two-dimensional array of grid stage stacks of switching elements, which grid stage stacks are arranged substantially parallel to each other along a stack direction perpendicular to the plane of the matrix converter. The input of the grid stage stacks is provided by bus bars located on one side of the grid stage stacks and substantially in a plane parallel to the plane of the matrix converter. The output of the grid stage stacks is collected by grid bus bars located on the other side of the grid stage stacks and substantially in a plane parallel to the plane of the matrix converter.

Again preferably, the bus bars are arranged substantially orthogonal to the grid bus bars also in case of such a two-stage matrix converter.

Preferably, the switchable elements of the matrix converter (typically switched thyristors, or correspondingly arranged IGBT's, IGCT's, or GTO's) are thus arranged in a multitude of preferably regularly arranged stacks, wherein these stacks are located in a direction substantially perpendicular to a plane of the matrix converter. It is noted that also so-called BCTs (Bidirectional Control Thyristors) as available from ABB Semiconductors AG, Switzerland (see, e.g., ABB Doc. No. 5SYA 2006-2 Feb. 1999, "Bi-Directional Control Thyristor", Product Information, Björn Backlund, Jan-Olav Boeriis, Ken Thomas, Robert Waishar, Jürg Waldmeyer, Orhan Toker, ABB Semiconductors AG, February 1999) can be used in these stacks, these BCT elements integrating two anti-parallel high voltage thyristors. In this case, stacks of opposite polarity merge into single stacks.

According to a further embodiment of the invention, in the grid stage there is provided a regular arrangement of k rows with 2n stacks, preferably of alternating polarity (such pairs can be replaced by combined elements as, for example, possible if BCT-elements are used), and orthogonal thereto 2n columns, preferably with equal polarity.

In such a setup, it is possible to arrange the bus bars parallel to the rows and the grid bus bars parallel to the columns.

According to still a further embodiment of the present invention, in the first stage m/k of the m phases of the polyphase alternating current of the generator are controlled in k generator stacks of switchable elements. The generator stacks can be oriented parallel to the grid stage stacks and located in a further column on one side of the matrix of the grid stage stacks parallel to the direction of the columns. It is in this case possible to collect the output of each generator stack by a collecting generator stage conductor leading upwards and connected to the bus bars.

According to yet another embodiment of the invention, adjacent grid bus bars are connected under formation of n phases.

One further embodiment of the matrix converter according to the invention is characterised in that m is an integer multiple of n, wherein the converter comprises two stages, wherein the stage of the converter in which each phase of the polyphase alternating current is controlled by at least one controllable bidirectional switch is the first stage and directly connected to a generator, and wherein the second grid stage of the converter comprises m/n groups of controllable bidirectional switches, each group comprising n parallel bidirectional switches individually connected to each of the phases of the alternating output current, said grid stage being directly connected to a transformer or a load, and wherein preferably from the generator m phases are forming the input of the first stage, wherein m/n phases are forming the output of the first stage, wherein groups of n, preferably adjacent, output phases of the first stage are connected, and wherein each of the thus formed m/n conductors is connected with each of the bidirectional switches of a corresponding group of the grid stage of the converter.

The present invention furthermore relates to an improved electrical machine comprising a stator and a rotor rotatably and coaxially mounted therein and comprising a housing within which the stator and the rotor are substantially located. Preferably the electrical machine is a generator. In addition to the above, the electrical machine comprises an electronic power unit for conversion of polyphase alternating current, e.g., provided by the stator due to a mechanically induced rotation of the rotor.

According to this aspect of the invention, the electronic power unit is located in a separate cubicle and this separate cubicle is located outside of the housing and substantially radially adjacent to the stator. Preferably, the electronic power unit is a matrix converter as outlined above.

So far, in accordance with the state-of-the-art, typically the alternating current generated in the stator of a generator is guided to a space consuming cubicle having a matrix converter and which is located in a separate area of the industrial hall of the generator. Such a cubicle for accommodating a matrix converter as for example proposed in the above-mentioned DE-A-100 51 222 may, for the case of a high-power generator (e.g., 150 MW machine) easily comprise around 1000 thyristors which necessitate a cubicle which is, e.g., 2 m high and 40 m long. So one can see that for a high-power generator such a matrix converter may be very space consuming. As already proposed in the application PCT/EP2006/060617, it is in principle possible to reduce the number of thyristors for example by providing a multistage matrix converter. Such a topology would not only reduce the number of necessary high-power switching elements, but it will also reduce the space requirements.

It has now been found that the one very appropriate location for a cubicle with a matrix converter, or generally of an electronic power unit for conversion, is right laterally adjacent to the stator, such that the connectors connecting the electronic power unit to the end windings of the stator are as short as possible in order to keep dissipation and stray field problems at a minimum.

In a first embodiment of the present invention, the axis of the stator is substantially horizontal and the cubicle is located on top of the housing. Equally, the cubicle may be located in a way sideways attached to the housing. Typical space conditions in power plant halls show that usually on the top of the generator room is available for the electronic power unit, which is preferably a matrix converter.

According to a further embodiment of the present invention, the electrical machine is a generator, and the electronic power unit is a matrix converter as defined above. The cubicle is, e.g., located such that the input connections from the stator side of the matrix converter are substantially in one plane with end windings on one side of the stator, wherein this plane is perpendicular to the axis of the rotor. So indeed the cubicle is basically sitting on top of the generator and the input of the matrix converter is located aligned with one axial end of the generator. In such an arrangement, conductors from the end windings of the stator to the input connections of the matrix converter can be designed very short if they are for example substantially located in this plane. This plane of the matrix converter is preferably arranged substantially tangential to the stator and preferably above the housing.

Again, the switchable elements of the matrix converter (typically switched thyristors, or correspondingly arranged IGBT's, IGCT's, or GTO's) are arranged in a multitude of preferably regularly arranged stacks, wherein these stacks are located in a direction substantially perpendicular to a plane of the matrix converter. It is noted that also the above mentioned BCTs can be used in these stacks, these BCT elements integrating two anti-parallel high voltage thyristors. In this case stacks of opposite polarity merge into single stacks.

Since the matrix converter, or more generally the electronic power unit, is located directly adjacent to the generator, vibrational problems may occur. According to a further embodiment, therefore, the matrix converter which is mounted in the cubicle is mounted therein in a way such that it is vibrationally decoupled from the stator and the rotor and/or that the cubicle as a whole is mounted on the housing in a way such that it is vibrationally decoupled from the stator and the rotor or generally from the generator. For vibrational decoupling the matrix converter and/or the cubicle can either be suspended and/or mounted on a damped support. To allow such decoupling, the conductors from the end-windings of the stator to the matrix converter should comprise flexible parts such as flexible stranded conductors.

According to a further embodiment, the electrical machine is a horizontally oriented generator generating a polyphase output available at end windings of the stator of said generator, wherein this polyphase output is conducted by means of generator phase conductors to the input of a matrix converter located in a cubicle on top of the housing of the generator, wherein the generator phase conductors comprise vertical portions and, if applicable, circumferential portions. In particular the phases from the bottom part of the stator are collected by circumferential parts.

Preferably, the housing comprises a top opening, and the cubicle comprises at least one feed-through openings in its bottom wall, and the generator phase conductors are mounted such as to, with their vertical parts, lead through the feed through opening of the cubicle to input connections of the matrix converter. The generator phase conductors or groups of generator phase conductors are preferably located such as to make sure that they are not interfering with each other (and/or with the walls of the cubicle) such as to keep insulation requirements as low as possible. Preferably, the matrix converter comprises a first generator stage in which m/k of the m phases of the polyphase alternating current of the generator are controlled in k (k<m) stacks (generator-stacks) of switchable elements (e.g., thyristors), and wherein groups of m/k generator phase conductors are jointly guided upwards (but still isolated from each other) to generator-stacks for feeding into the matrix converter.

BRIEF DESCRIPTION OF THE DRAWINGS

In the accompanying drawings, embodiments of the invention are shown in which.

DETAILED DESCRIPTION OF EXEMPLARY EMBODIMENTS

Figure 1:
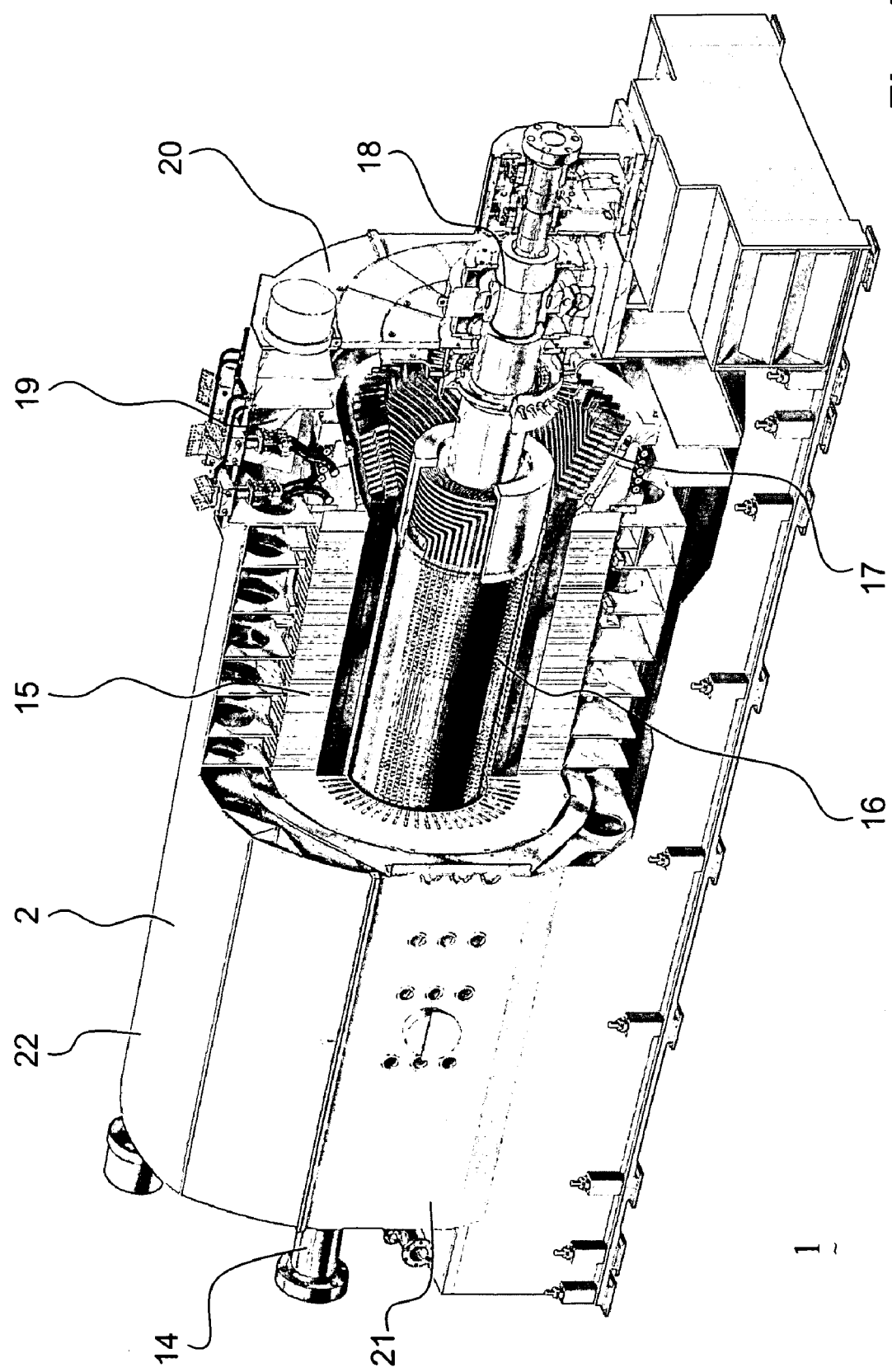
FIG. 1 is a perspective view of a generator according to the state of the art, wherein on one side peripheral parts are removed, in order to display the end-winding portion of the stator and details of the rotor.

Referring to the drawings, which are for the purpose of illustrating the present embodiments of the invention and not for the purpose of limiting the same, FIG. 1 shows a generator 1 according to the state of the art, in which a stator 15 is mounted in a housing 2. In the bore of the stator the rotor 16 of the generator is mounted, wherein the rotor is carried by bearings 18, located on both sides of the stator. The rotor 16 extends into a shaft 14, and on one side the shaft 14 is coupled to, for example, a turbine providing the mechanical energy for rotation of the rotor.

On each terminal side, the stator includes free stator-windings, the end-windings 17, and the output current of the stator generated due to the rotation of the rotor is guided to the grid by first collecting it by the so-called phase rings or circular rings and by then guiding the current out of the housing via the top opening 19.

The housing is generally of elongate shape and includes sidewalls 21 parallel to the axis of the stator and a top cover 22 in which the above mentioned top opening 19 is located. An intricate cooling and cooling medium circulation system is usually present in the housing and in the stator as well as in the rotor.

Figure 2:
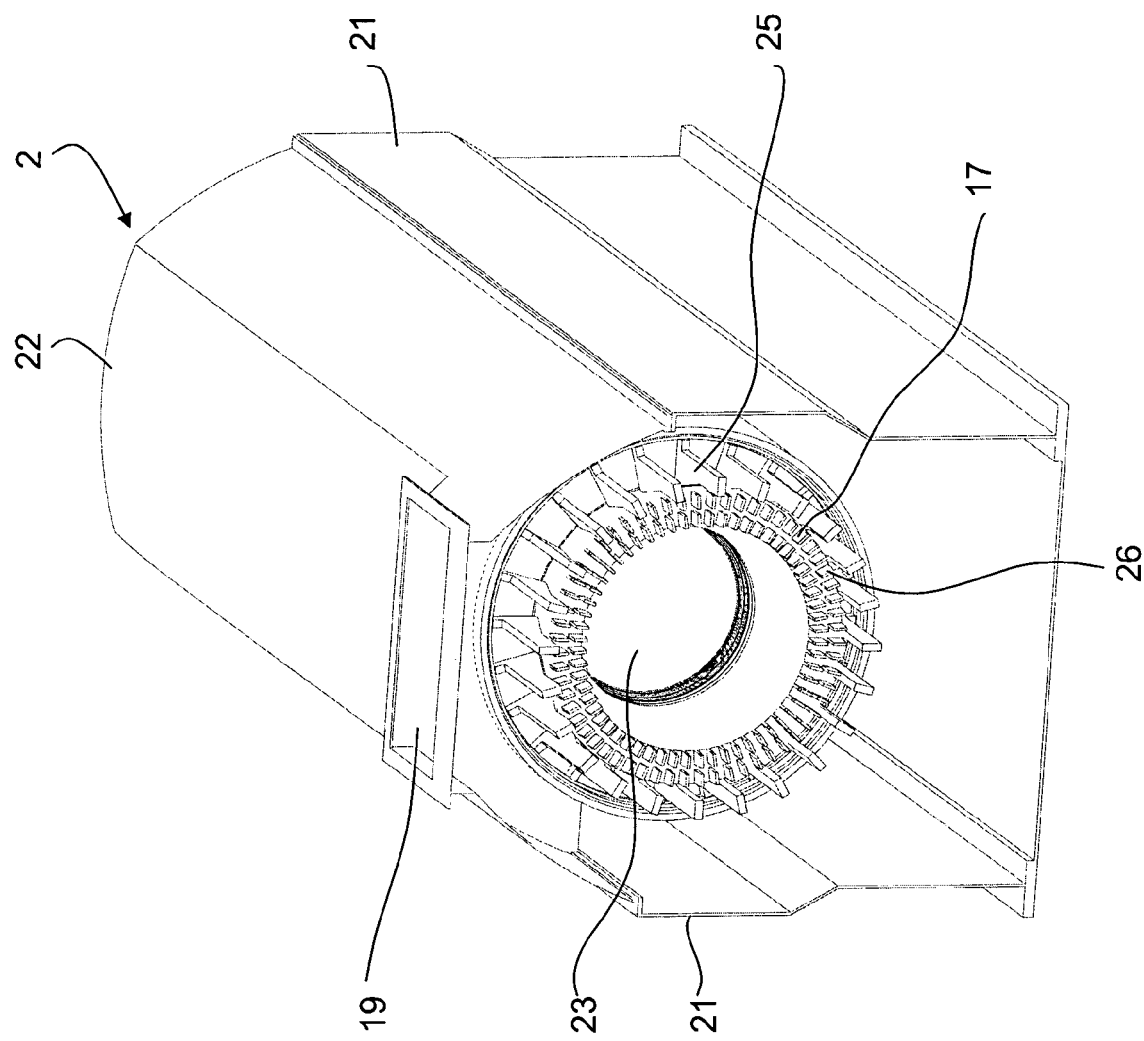
FIG. 2 shows a schematic perspective view of a generator according to FIG. 1 in a housing, wherein the end caps bearings, the air guide as well as the circular rings and the brackets are removed for visualising the end-winding section of the stator.

FIG. 2 shows such a generator set up in a perspective view, wherein, however, the rotor has been removed from the bore of the stator and bearings, and cooling systems etc. have been removed. In the top wall 22 of the housing 2 the opening 19 is rather small and is located right above the end-winding 17 on one side of the stator. For better visibility, the circular rings and the insulation sleeves 29 on the conductors 26 of the end-winding have been removed. Here one can recognise the isolating brackets 25 located peripherally and the conductors 26 of the end-windings of the stator 15. If a generator is to be modified for use of a matrix converter as described further below, so for use with a matrix converter using a poly-phase output of the stator, those parts, as removed in the display according to FIG. 2, will have to be removed in order to allow the different connectivity to be established on the end-windings of the stator 15. This will be outlined in more detail below.

Figure 3:
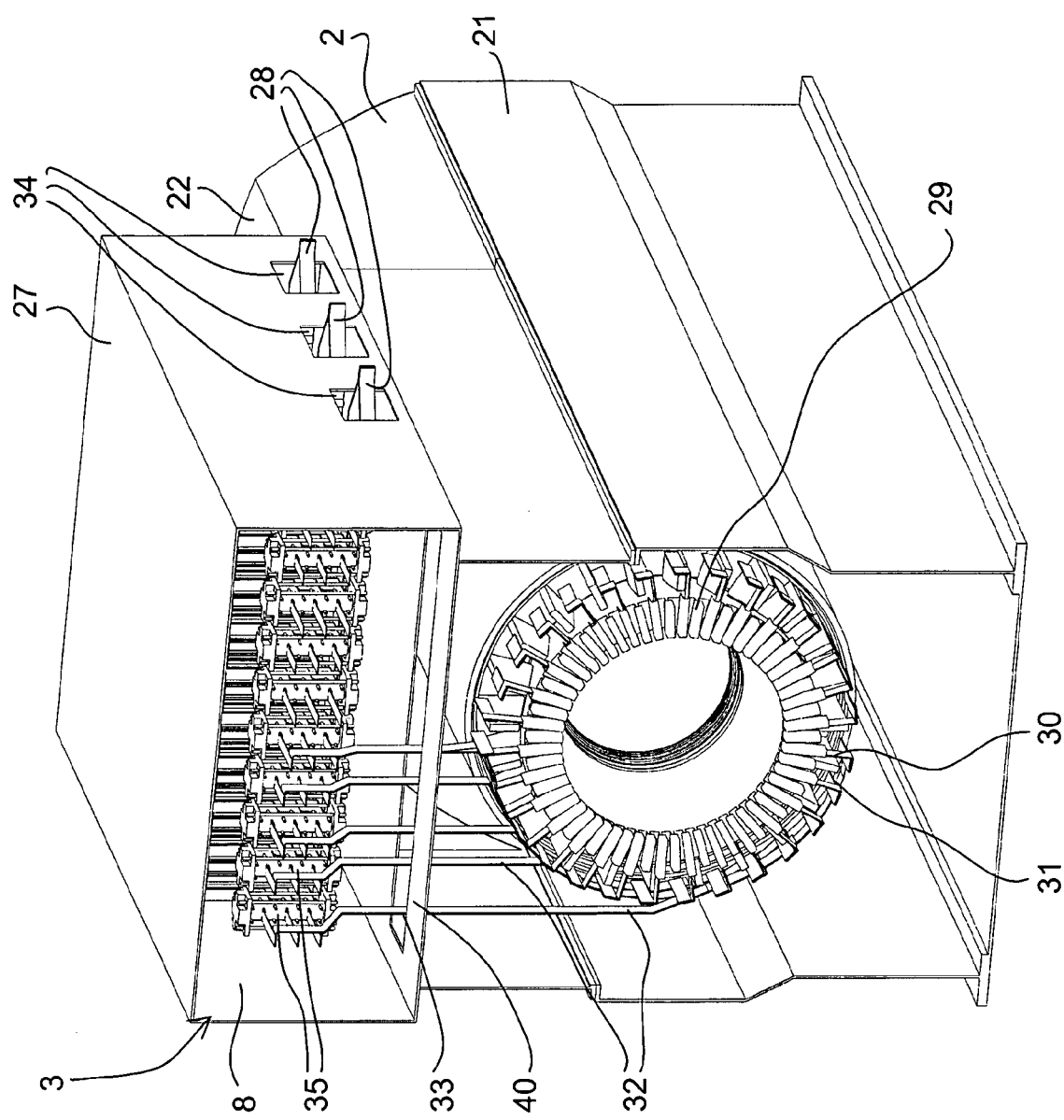
FIG. 3 shows a perspective view of a generator with a matrix converter located in a cubicle on top of the housing of the generator.

FIG. 3 shows such a modified generator including in addition to that a matrix converter located on top of the housing 2 in a cubicle 27. One can clearly see the modified end-winding region, where instead of the circular rings, each of the output phases on the end-windings 17 of the stator is first radially guided outwards by connecting conductors 30. These connecting conductors 30 are, if located on the bottom part of the end-winding 17, first guided circumferentially by individual generator phase conductors 31. Groups of such conductors (shown as a group of three) are at a certain position vertically guided upwards in the vertical parts of the generator phase conductors 32. So the vertical part, displayed in FIG. 3 and indicated with reference numeral 32, actually indicates groups of three subsequent generator phases 6 which are isolated from each other. So the m=30 individual generator phases as present in a design according to FIG. 3 are guided upwards in five groups 32 on one side of the stator and further five groups on the other side of the stator, wherein for better visibility in FIG. 3 only one half on the left side of these groups of conductors 32 is displayed.

On top of the housing 2 of the generator there is provided a cubicle 27, which in its bottom wall 40 is provided with an elongate feed through opening 33 through which the groups of conductors 32 are guided to the actual matrix converter 3. The opening 33 as well as the distances between the individual groups of conductors 33 are designed such as to avoid shorts between conductors and/or the housing. As one can see, the matrix converter 3 is located in the cubicle 27 in a plane which is tangential to the axis of the stator, and the matrix converter is located adjacent on top of the stator.

In the view according to FIG. 3 one can see the first group of shared input switches which represent the first stage of the converter, which in the following shall be designated as generator stage 8. Behind that generator stage and not visible in FIG. 3 there is located the second group of shared output switches, the second stage of the converter, which shall subsequently be called grid stage 9. The group of stacks of switches forming the generator stage is substantially located in the plane of the end-windings of the stator, such that as little distance as possible is between the end-winding of the stator and the input conductors of the individual stacks 35 of the generator stage 8. The output of the matrix converter, that is, the three phases to the transformer or to the grid indicated with the reference numeral 28, are fed out of the cubicle 27 on the lateral side by three individual feed-through openings 34 in the side wall of the cubicle 27.

It is noted that preferably the matrix converter includes a cooling system separate from the one of the generator. Water cooling is preferred, whereas the generator uses gas cooling.

Figure 4:
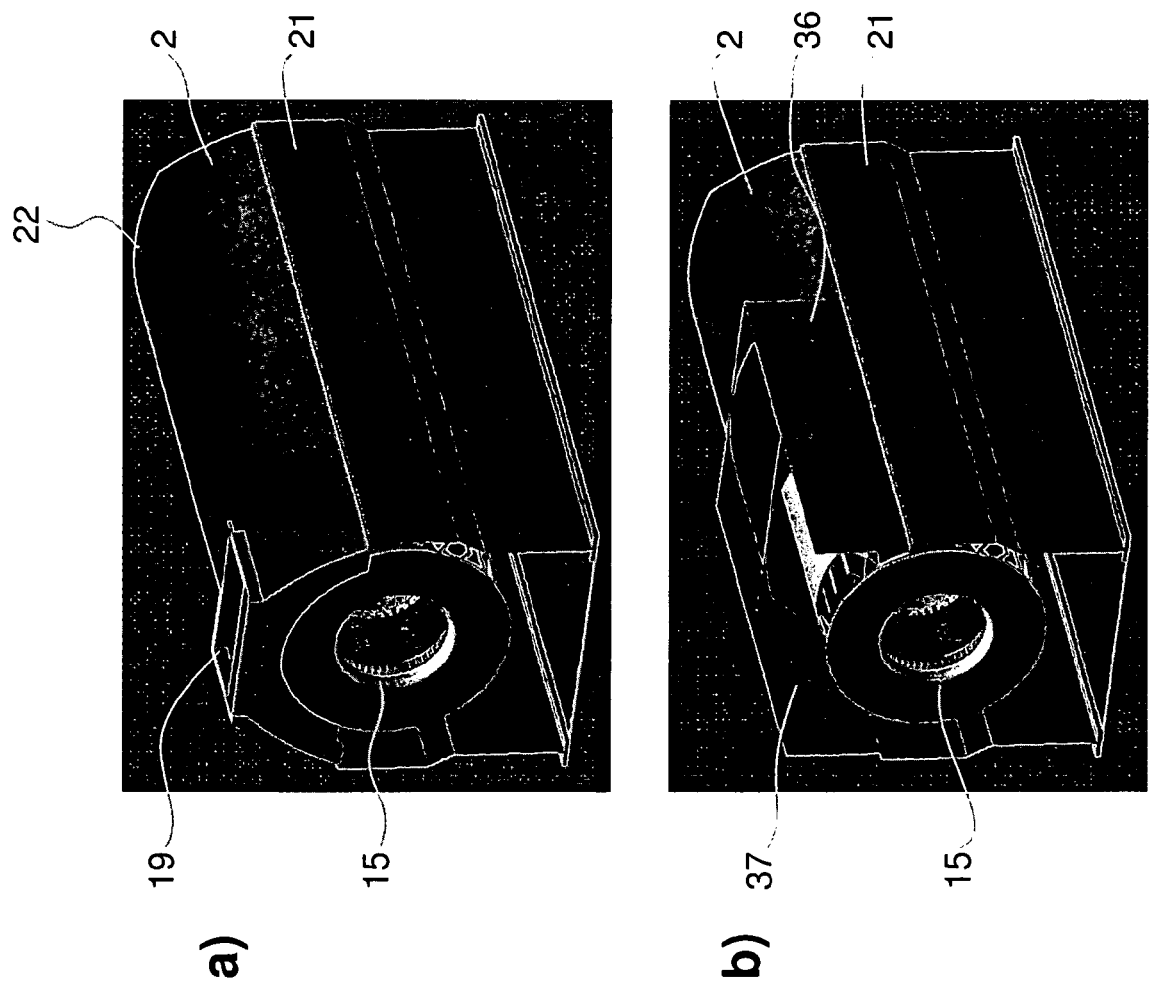
FIG. 4 schematically shows the differences in the housing of a generator on the one hand according to the state of the art (a) and on the other hand according to the invention (b)

As one can see from FIG. 4, the housing 2 of a generator will have to be modified slightly in order to accommodate the cubicle 27 including the matrix converter. So as visible from FIG. 4a), the housing 2 according to prior design only includes a small top opening 19. In order to be able to accommodate the cubicle 27, however, it might be useful to provide supporting walls on the terminal end on which the matrix converter is to be located, and it is in most cases appropriate to increase the opening right above the end-windings of the stator 15 so to have a large top opening 37 as visualised in FIG. 4b). The cubicle 27 is then simply to be put on top of this supporting construction 36, as indicated in FIG. 4b), which shows the inherent modularity of the system and the associated advantages.

Figure 5:
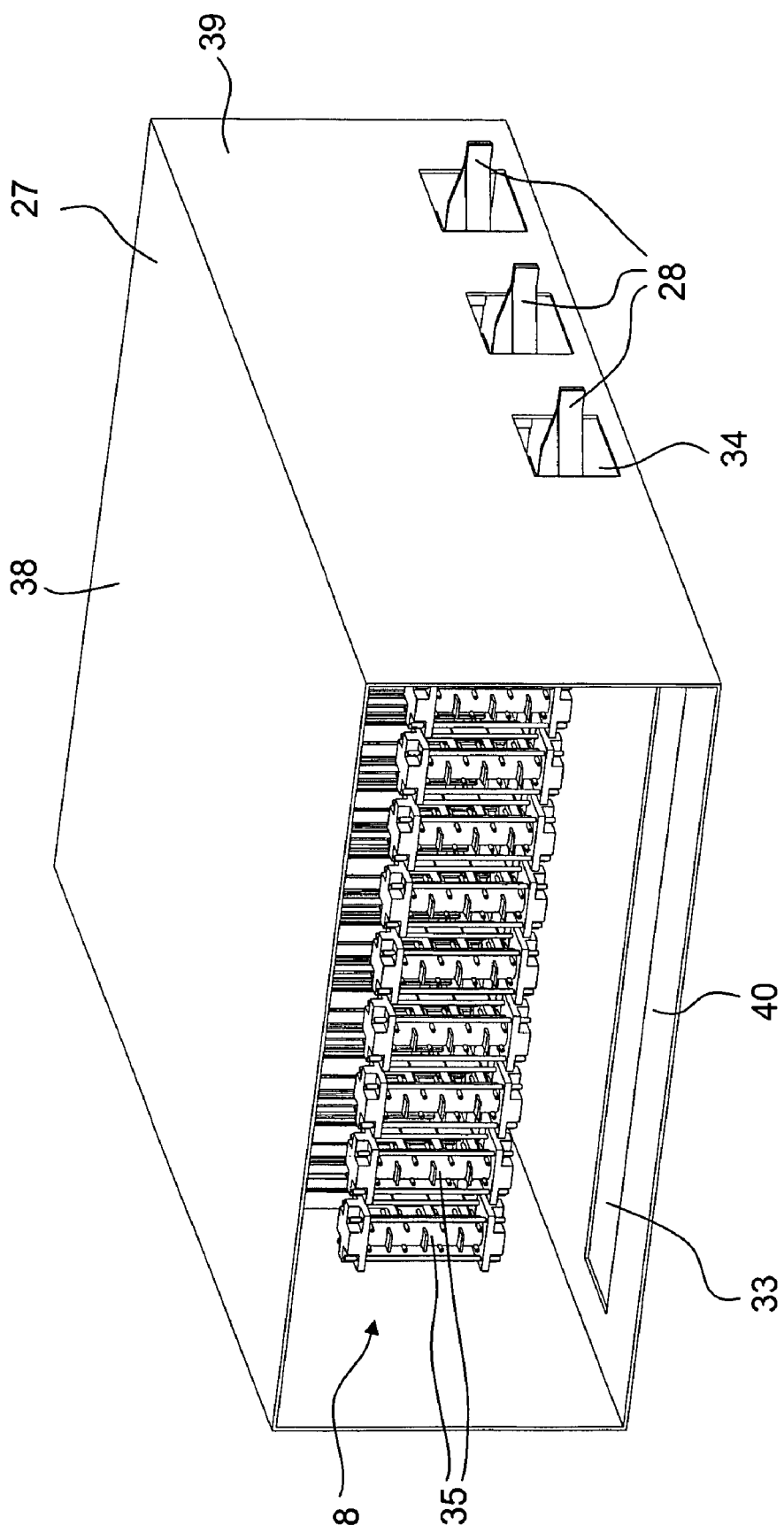
FIG. 5 shows a perspective view of a cubicle with a matrix converter in more detail, without the generator.

FIG. 5 shows such a cubicle in more detail. Such a cubicle, which usually is provided by completely different producers than a generator, is an individual unit that can be adapted to generator designs in a modular manner. Usually, the three phases to the transformer/grid 28 are guided out of this housing 27 on a lateral side through the side wall 39; it is, however, also possible to lead them out via the top wall 38, in which case the arrangement of stacks as described further below would have to be oriented upside down so that the grid bus bars (see further below) are located on the top side of the matrix converter 3.

Figure 6:
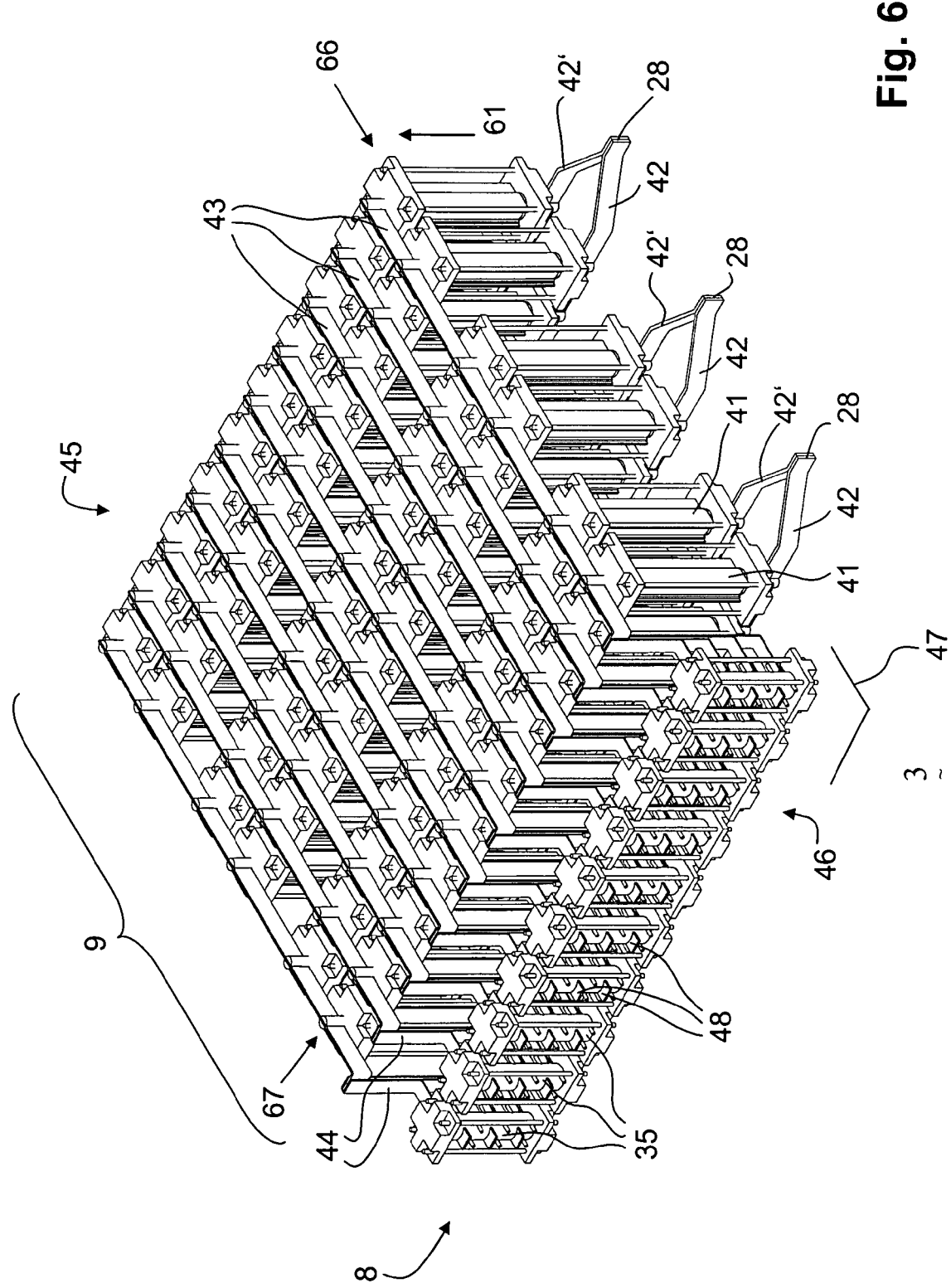
FIG. 6 shows the arrangement of the switching elements in the matrix converter after removal of the cubicle.
Figure 7:
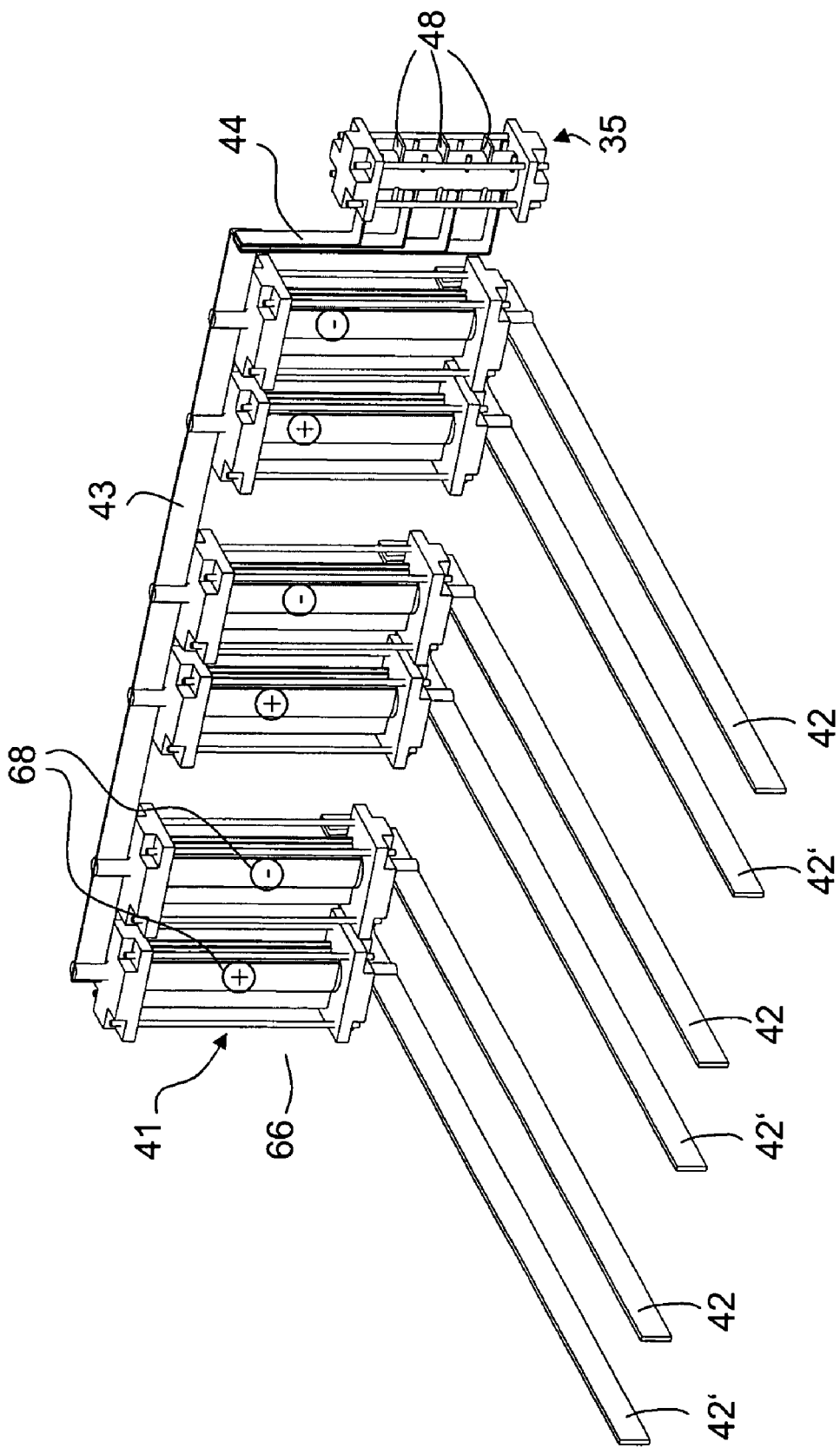
FIG. 7 shows a perspective view of only one branch of the matrix converter according to FIG. 6 for better visibility of the connecting means.
Figure 8:
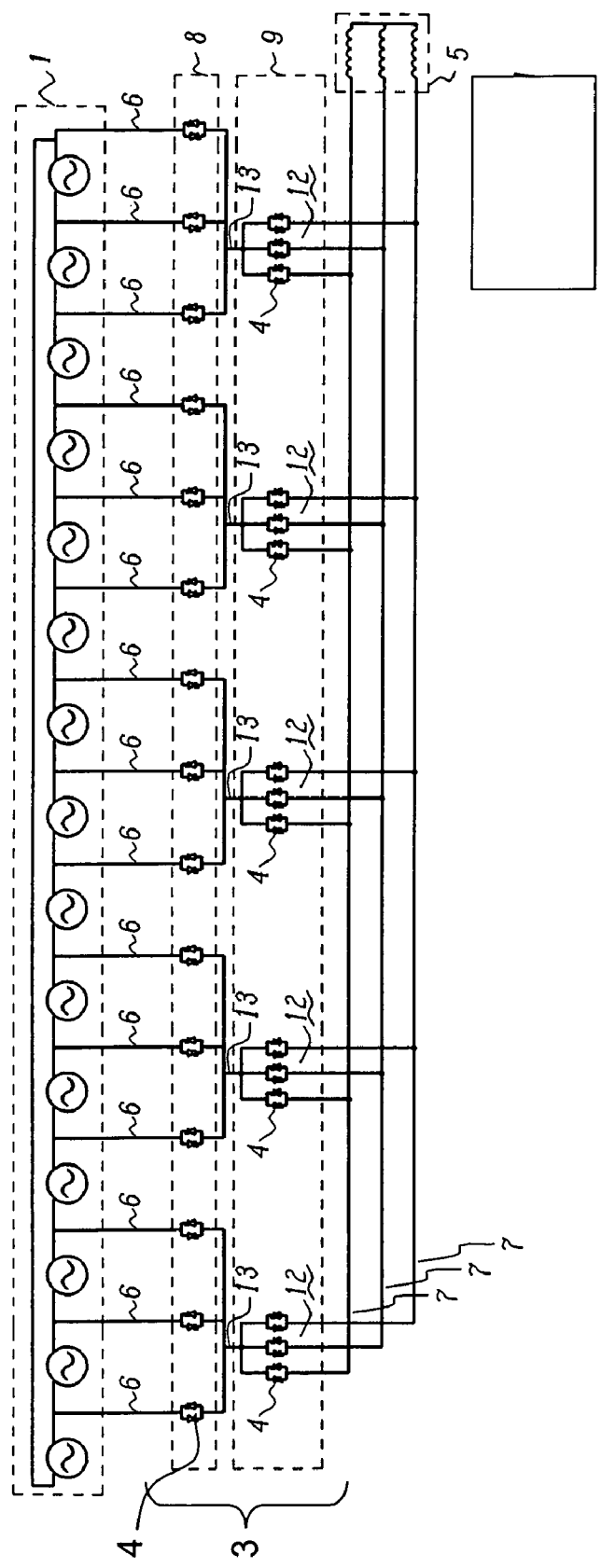
FIG. 8 shows the topology of a two-stage matrix converter as displayed in FIGS. 6 and 7, wherein in (a) a standard display of the topology is shown for 15 generator phases, and in (b) the full topology as given in FIGS. 6 and 7 is given in a way matching the connectivity of a set up according FIGS. 6 and 7.
Figure 8:
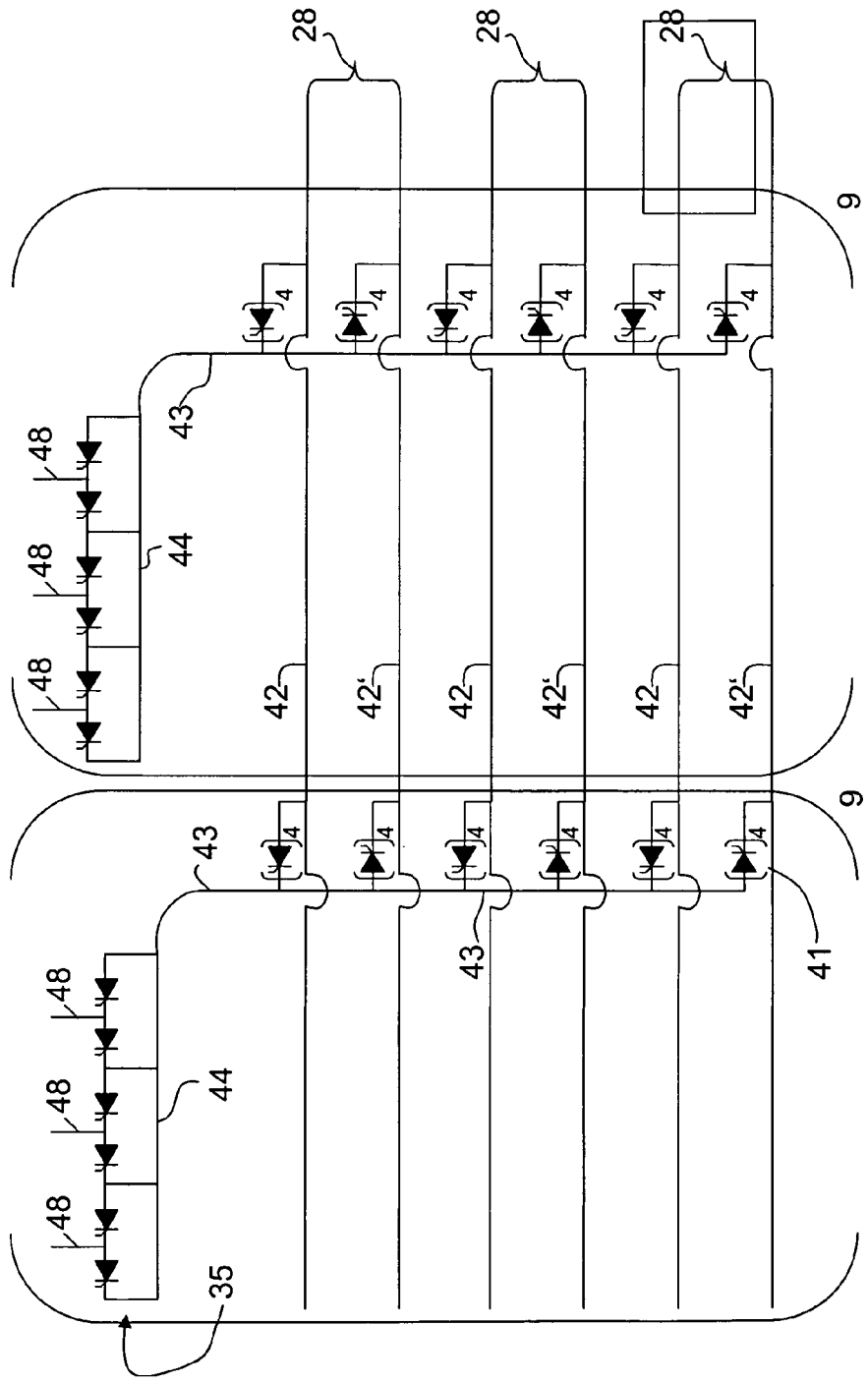

FIG. 6 shows a matrix converter which can be located in a housing as given in FIG. 5 after removal of the housing. The matrix converter is a two-stage matrix converter including a generator stage 8 which provides the connection to the generator end-windings, and a grid stage 9. Calculations have shown that contrary to expectations, the load on the grid stage is significantly larger than the load on the generator stage (9:1), necessitating much more individual electronic switching elements in the grid stage for withstanding the power during the switching process. It is noted that the specific topology of a matrix converter as given in FIGS. 6-8 is analogous to the one as disclosed in PCT/EP2006/060617 and therefore in respect of the specifics of the topology reference is made specifically to this document and its disclosure is incorporated by reference herein.

As one can see from FIG. 6, the matrix converter 3 is located substantially in a plane 47 which is a tangential plane to the principal axis of the generator if the matrix converter is to be located on top of the generator as given in FIG. 4.

The generator stage 8 of the matrix converter includes a column 67 of individual stacks 35 of high-power switching elements. The particulars of these stacks of switching elements 35 shall be illustrated in more detail further below. Each of these stacks 35 includes three feed-in conductors 48 which are connected to the generator phases as already outlined above by the vertical parts of the generator phase conductors 32.

These stacks 35 are oriented substantially perpendicular to the plane 47, so parallel to a so-called stack-direction 61. Adjacent to this column of generator stage stacks 35 of the generator stage 8, there is provided the grid stage 9 which is formed by ten rows 66 of individual grid stage stacks 41. In other words, since those grid stage stacks 41 are arranged regularly in a square arrangement, in this grid stage there are six adjacent columns 67. The output of the individual generator stage stacks 35 is collected by collecting generator stage conductors 44, which collect the output of each of the stacks 35 and guide it vertically upwards into a plane above the stacks 41. On top of the array of stacks 41 there is provided a parallel array of distributing inter-stage conductors, called bus-bars 43, leading away from the generator stage 8 in a direction perpendicular to the direction of the column 67 of the generator stage 8. Those bus-bars 43 have a length extending over the full rows 66 of the grid stage 9. On the bottom side of the stacks 41 of the grid stage 9, there is also provided conductors, namely collecting grid conductors which are called grid bus-bars 42. Adjacent grid bus-bars 42, 42' are group-wise joined to form the three phases 28 which are then coupled to the transformer or the grid.

It is noted that if BCT's are used, the two conductors 42 and 42' are single conductors.

In order to illustrate the topology in more detail, in FIG. 7 only one branch of the matrix converter is displayed, so only one generator stage stack 35 and only one row 66 of the grid stage 9. As one can see, the polarity of the switching elements in the subsequent stacks 41 in the row 66 is alternating, which is schematically indicated by plus and minus in circles. The output of each pair of such plus and minus stacks 41 is then collected by a pair 42, 42', which are then grouped to form one of the three phases 38 as visible in FIG. 6. It is noted that in case of use of the above mentioned BCT-elements, the plus and minus stack are merged into single stacks.

In principle, the topology as arranged in space according to FIG. 6 corresponds to a topology as indicated in FIG. 8 and which is the general topology for a two-stage matrix converter including a generator stage 8 and a grid stage 9 with the minimum of numbers of switching elements or bidirectional switches 4. The basic concept of this two-stage matrix converter is that if a high-phase order generator has to be connected to a load, the use of a matrix converter leads to an excessive number of switching elements. Costs as well as dimensions will therefore dramatically increase if the number of phases is increased. It is, however, possible to split piles of switching elements (thyristors) e.g. into two parts. Thus, a first stage 8 is generated in which each of the input phases 6 is provided with an individual bidirectional switching element 4. In addition to that, the output switches can also be shared, leading to the final architecture as given in FIG. 8a). The output switches which belong to the grid stage 9 of the matrix converter are grouped into m/n groups 12 (in a specific example, as given in FIG. 8, this leads to five groups 12 for fifteen generator phases 6), wherein each of these groups 12 includes a number of bidirectional switches that equal the numbers of output phases 7 (in a specific example, as given in FIG. 8a, this means three bidirectional switches 4 per group 12), wherein these bidirectional switches 4 are individually connected to the corresponding output phase.

The first stage 8 is connected with the second stage 9 in that m circumferentially neighbouring input phases of the stator of the generator are joined on their non-generator side to form single conductors 13. In this set up therefore the number of input phases 6 has to be an integer multiple of the number of output phases 7. In the present case according to FIG. 8a, where there is fifteen input phases 6 (m=15) and three output phases (n=3), this leads to five conductors 13, which can then be connected to the input of the groups 12 in the second stage 9 of the matrix converter as detailed above. It is to be noted that for better visibility in FIG. 8a) only fifteen generator phases 6 are used and not thirty as, e.g., in the matrix converter according to FIGS. 6 and 7. The set up according to FIG. 8a) just has to be doubled in order to get the topology as given in FIGS. 6 and 7.

It is however difficult to recognise this principal topological arrangement of switching elements according to FIG. 8a) in the set up according to the FIGS. 6 and 7 above. However, one recognises after some analysis that the topology according to FIG. 8a) can be re-drafted (now for thirty generator phases indicated by the feeding conductors 48 of the stacks 35) according to the schematic topological display given in FIG. 8b). This topology is equivalent to the one according to FIG. 8a (for the double of generator phases), and it allows recognition of the equivalence between the topology according to FIG. 8a) and the design according to FIGS. 6 and 7.

One of the key advantages of the set up according to FIGS. 6 and 7 is the fact that the orthogonal orientation of the grid bus-bars 42 and of the bus-bars 43 on two opposite sides of the array of stacks 41 of the grid stage 9 leads to an extremely compact design with optimally short conductor lengths, thus leading to a highly compact, intuitive and easy to maintain structure with as little space requirements as possible and as little dissipation as possible.

Figure 9:
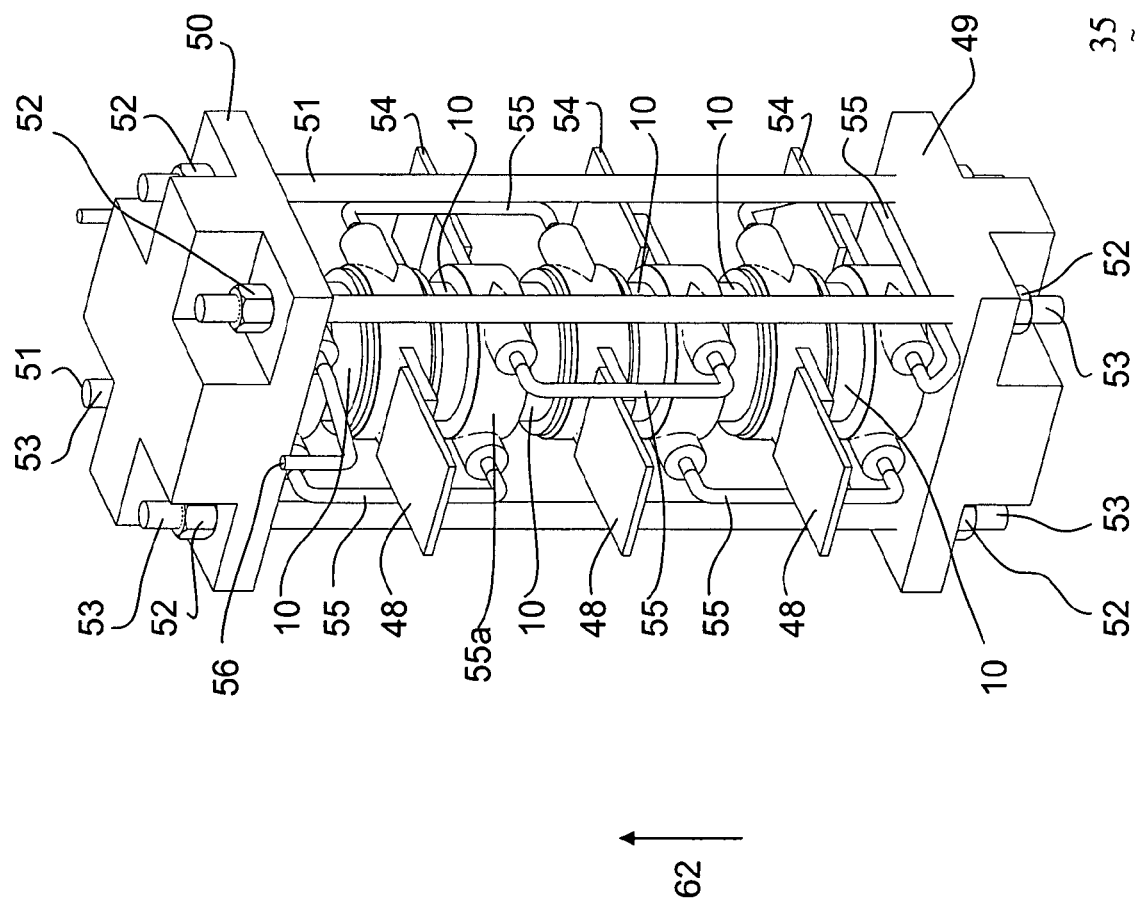
FIG. 9 shows a stack of high power switching elements used in the generator stage of the matrix converter in a perspective view.

FIG. 9 shows one generator stage stack 35 in more detail. As one can see, each of these stacks 35 includes six high-power switching elements 10, e.g., thyristors, which are stacked on top of each other. This stack is held together by a construction including a bottom plate 49 and a top plate 50 which are held together by four parallel rods 51, which are screwed together by pairs of nuts 52, which are screwed onto a threading 53 on the ends of the rods. This construction is necessary in order to maintain the high compression power on the switching elements. On the generator side the stack 35 includes three feed-in conductors 48 on top of each other. On the output side, that is, towards the grid stage 9, the four lead-out conductors 54 (the top one is not visible in FIG. 9) of one stack are connected to a collecting generator stage conductor 44, leading to a topology as easily recognisable in FIG. 8b). Furthermore, due to the high power to be dissipated in such a system, an intricate cooling system is proposed in which a cooling medium is fed through cooling boxes 55a between switching elements by cooling ducts 55 with inlets and outlets for cooling medium, e.g., de-ionized water or another cooling medium.

Figure 10:
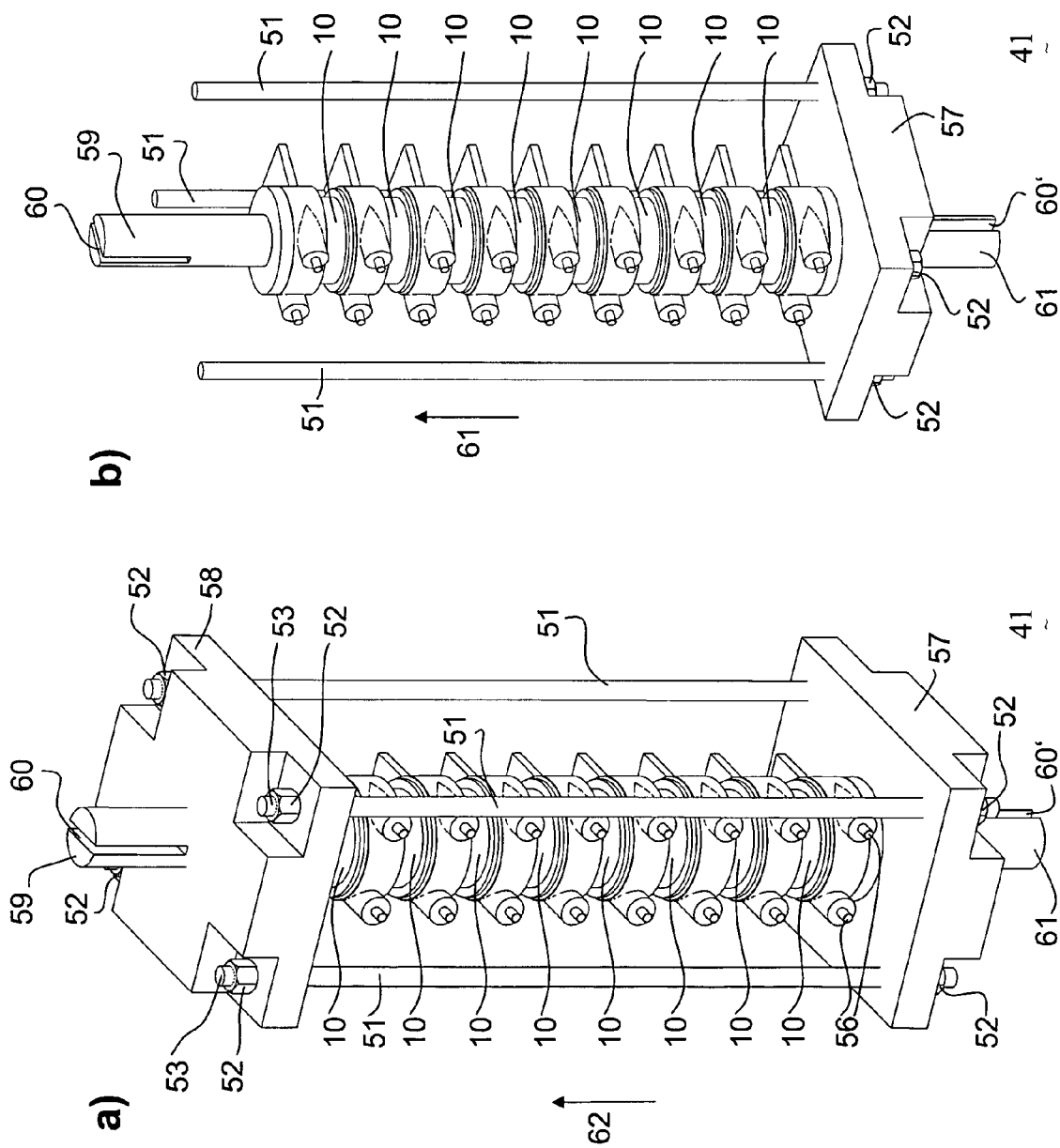
FIG. 10 shows two different views of a stack of electronic high power switching elements as used in the grid stage of the matrix converter, wherein (a) shows the full stack including bottom plate and top plate, and (b) shows the stack with top plate removed.

FIGS. 10a and 10b show perspective views of grid stage stacks 41. In contrast to the above generator stage stack 35, in which current is flowing in a substantially generally horizontal direction, in those grid stage stacks 41, which represent a series of switchable elements, current flows in a substantially vertical direction. As one can see, grid stage stacks 41 are each a stack of eight switching elements 10 with equal polarity. Also this stack is held together by a bottom plate 57 and a top plate 58, and there is provided four rods 51 on each edge, holding those two plates together by nuts 52 screwed onto threads 53.

As already outlined above, the grid bus-bars 42 and the bus-bars 43 are oriented perpendicularly. Correspondingly, therefore, connection to the bus-bars on the top side of such a stack 41 is provided by a feed-in conductor 59 which is provided with a slot 60 to take up the bus-bars. On the bottom side of each of these stacks 41 there is provided a lead-out conductor 61 which is also provided with a slot 60', wherein this slot 60' is oriented perpendicularly to the upper slot 60. A highly modular and easy to replace system is thus provided with a high density of switching elements. Also here cooling of the individual switching elements is possible and one can recognise the corresponding inlet and outlet openings, however the individual connections are not displayed for better visibility.

Figure 11:
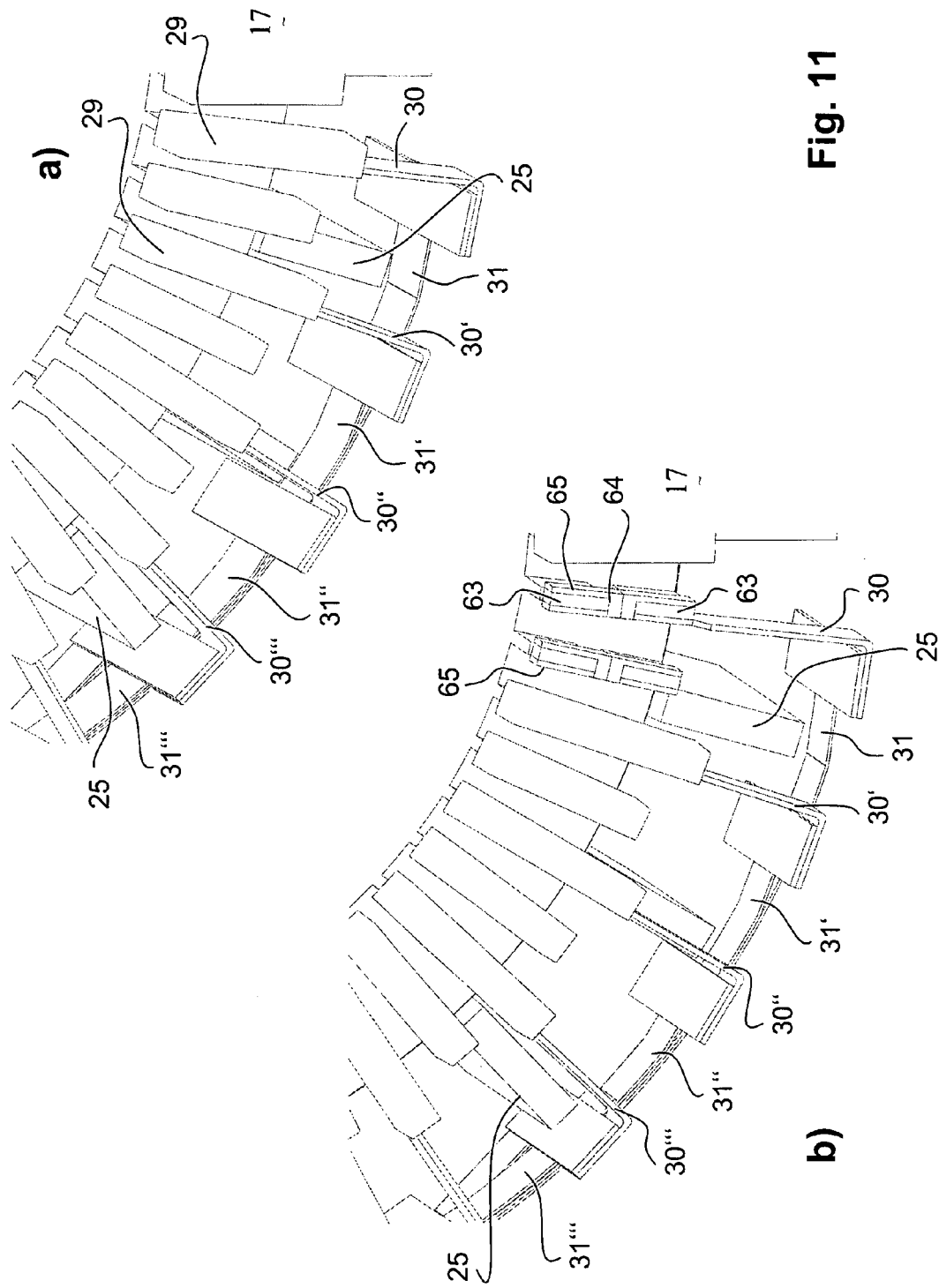
FIG. 11 shows a perspective view of the end-winding region of the stator with the modified lugs and the newly proposed conductors for feeding the generator phases to the matrix converter located on top of the generator, wherein in (a) a situation is shown in which the insulation sleeves are mounted on the end-windings, and in (b) two of the insulation sleeves are removed to show the details of the connecting conductors of the end-windings.

FIG. 11 shows the details of the modified end-winding region of the stator 17. As already mentioned above, the circular rings of a design according to the state of the art are removed and are replaced by a different construction. As a matter of fact, each of the individual generator phases or the corresponding conductors 63 are first radially outwardly connected by a radial connecting conductor 30. This connecting conductor 30 is most easily connected to the copper conductor 63 of the end-winding by correspondingly adapted connection clamps 65 in the slots 64 in the copper conductors 63. The connecting conductor 30 is of an L-shape and is subsequently connected to the circumferential part 31 of the generator phase conductor. Circumferentially adjacent generator phases are each individually connected to such circumferential parts 31, 31', 31" and 31''', so that stacks of these circumferential conductors result. These conductors are of course isolated in respect of each other. As one can see from FIG. 3, as soon as the proper radial position of such a group of conductors 31 is reached, they are guided vertically upwards in the vertical parts 32 in groups of 3 conductors. Due to the fact that those individual generator phases have rather small voltages, only small insulation is necessary for these conductors.

LIST OF REFERENCE NUMERALS 1 generator
2 housing of the generator
3 matrix converter
4 bidirectional switch
5 transformer
6 polyphase alternating current
7 alternating output current
8 group of shared input switches, first stage of the converter, generator stage
9 group of shared output switches, second stage of the converter, grid stage
10 switching element, thyristor
12 group of bidirectional switches
13 conductor
14 shaft of the generator
15 stator of the generator
16 rotor of the generator
17 end windings of the stator
18 bearings of the shaft
19 top opening of the housing of the generator for leading through of conductors to the grid etc
20 end wall of 2
21 side wall of 2
22 top cover of 2
23 bore of the stator
25 isolating brackets
26 conductors of end winding
27 housing of matrix converter, cubicle
28 phase leads to transformer/grid
29 cover on 26, insulation sleeve
30 connecting conductor
31 generator phase conductor (circumferential part)
32 generator phase conductor (vertical part), groups of 3
33 feed through opening in 27 for 32
34 feed through opening in 27 for 28
35 generator stage stack
37 top opening for 27
38 top wall of 27

39 side wall of 27
40 bottom wall of 27
41 grid stage stack
42 collecting grid conductor, ending in leads 28
43 distributing inter-stage conductor, bus bar
44 collecting generator stage conductor
45 top side of matrix converter
46 bottom side of matrix converter
47 plane of the matrix converter
48 feed in conductors of 35
49 bottom plate of 35
50 top plate of 35
51 rod
52 nut
53 threading
54 lead out conductors of 35
55 cooling ducts
56 inlet/outlet cooling medium
57 bottom plate of 41
58 top plate of 41
59 feed in conductor of 41
60 slot
61 lead out conductor of 41
62 stack direction of 34 and 41
63 copper conductor of 17
64 slot in 63
65 connection clamp on 63
66 row of 41
67 column of 41
68 current flow polarity of 41

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A matrix converter for the conversion of a polyphase alternating current into a desired alternating output current, wherein the polyphase alternating current has m phases, the alternating output current having n phases, with n<m, the converter comprising:

at least one stage comprising a plurality of controllable bidirectional switches, in which at least one stage each phase of the polyphase alternating current is controlled by a controllable bidirectional switch, the at least one stage defining a matrix converter plane;

wherein said at least one stage comprises a two-dimensional array of stage stacks of switching elements, which stage stacks are arranged substantially parallel to each other along a stack direction parallel to the matrix converter plane;

bus bars located on one side of the stage stacks and substantially in a plane parallel to the matrix converter plane, the bus bars providing input to the stage stacks; and grid bus bars located on the other side of the stage stacks and substantially in a plane parallel to the plane of the matrix converter, the grid bus bars collecting the output of the stage stacks.

2. A matrix converter according to claim 1, wherein the bus bars are arranged substantially orthogonal to the grid bus bars.

3. A matrix converter according to claim 1, comprising m/n bus bars and 2n grid bus bars.

4. A matrix converter according to claim 1, wherein the at least one stage comprises at least two stages;

wherein, in at least one stage, each phase of the polyphase alternating current is controlled by a controllable bidirectional switch and is the first stage and is configured and arranged to be directly connected to a generator;

wherein the at least two stages comprises at least one grid stage including m/n groups of controllable bidirectional switches, each of said m/n groups comprising n parallel bidirectional switches configured and arranged to be individually connected to each of the phases of the alternating output current, wherein the at least one grid stage is the last stage of the converter and is configured and arranged to be directly connected to a transformer or a load;

wherein the at least one grid stage comprises a two-dimensional array of grid stage stacks of switching elements, which grid stage stacks are arranged substantially parallel to each other along a stack direction perpendicular to the matrix converter plane, and further comprising:

bus bars providing input to the grid stage stacks, the bus bars located on one side of the grid stage stacks and substantially in a plane parallel to the matrix converter; and grid bus bars collecting output of the grid stage stacks, the grid bus bars located on the other side of the grid stage stacks and substantially in a plane parallel to the matrix converter plane.

5. A matrix converter according to claim 4, wherein the grid stage comprises a regular arrangement of k rows with 2n stacks, and 2n columns orthogonal to said k rows.

6. A matrix converter according to claim 5, wherein the bus bars are parallel to the rows and the grid bus bars are parallel to the columns.

7. A matrix converter according to claim 4, wherein, in said first stage, m/k of the m phases of the polyphase alternating current are controlled in k generator stacks of switchable elements, and wherein the generator stacks are oriented parallel to the grid stage stacks and located in an additional column on one side of the matrix of the grid stage stacks parallel to the direction of the columns.

8. A matrix converter according to claim 7, further comprising:

a collecting generator stage conductor which collects the output of each generator stack, the collecting generator stage conductor leading upwards and connected to the bus bars.

9. A matrix converter according to claim 1, wherein adjacent grid bus bars are connected and form n phases.

10. A matrix converter according to claim 1, wherein m is an integer multiple of n, wherein the at least one stage comprises two stages, wherein one of the two stages in which each phase (6) of the polyphase alternating current is controlled by at least one controllable bidirectional switch is the first stage and is configured and arranged to be directly connected to a generator, and wherein the other of the two stages is a grid stage which comprises m/n groups of controllable bidirectional switches, each group comprising n parallel bidirectional switches configured and arranged to be individually connected to each of the phases of the alternating output current, said grid stage configured and arranged to be directly connected to a transformer or a load.

11. An electrical machine comprising:
   a stator;
   a rotor rotatably and coaxially mounted within the stator;
   a housing within which the stator and the rotor are substantially located; and
   a matrix converter according to claim 1 configured and arranged to convert polyphase alternating current;
   a cubicle separate from and outside said housing, wherein the matrix converter is located in the separate cubicle, and wherein the separate cubicle is located substantially radially adjacent to the stator.

12. An electrical machine according to claim 11, wherein the axis of the stator is substantially horizontal and the cubicle is located on top of the housing.

13. An electrical machine according to claim 11, wherein the electrical machine is a generator, wherein the stator includes end windings on one side of the stator and conductors from said end windings, and wherein the matrix converter comprises stator side input connections substantially in one plane with said stator end windings, wherein said plane is perpendicular to the axis of the rotor, and the end windings conductors extend to the matrix converter input connections substantially in said plane.

14. An electrical machine according to claim 13, wherein the matrix converter switchable elements stacks are located in a direction substantially perpendicular to the matrix converter plane, said matrix converter plane being arranged substantially tangential to the stator.

15. An electrical machine according to claim 11, wherein:
   the matrix converter is mounted in the cubicle so that it is vibrationally decoupled from the stator and from the rotor, or
   the cubicle is mounted on the housing so that it is vibrationally decoupled from the stator and from the rotor; or both.

16. An electrical machine according to claim 15, wherein at least one of the matrix converter and the cubicle is suspended, mounted on a damped support, or both, for vibrational decoupling.

17. An electrical machine according to claim 11, wherein the electrical machine comprises a horizontally oriented generator comprising said rotor, stator, and housing, said stator comprising end windings and generator phase conductors, the matrix converter including an input, said generator configured and arranged to generate a polyphase output available at the stator end windings, wherein said polyphase output is conducted by said generator phase conductors to the matrix converter input, wherein the cubicle is positioned on top of the housing, and wherein the generator phase conductors comprise vertical portions and optionally circumferential portions.

18. An electrical machine according to claim 17, wherein the housing comprises a top opening, wherein the cubicle comprises a bottom wall including a feed through opening, and wherein the generator phase conductors are mounted to lead through the feed through opening of the cubicle to the matrix converter input.

19. An electrical machine according to claim 18, wherein the matrix converter comprises a first stage in which m/k of m phases of the polyphase alternating current of the generator are controlled in k stacks of said switchable elements, and wherein groups of m/k generator phase conductors are jointly guided upwards for feeding into the matrix converter.

20. A matrix converter according to claim 5, wherein the k rows have alternating polarity.

21. A matrix converter according to claim 5, wherein the 2n columns have equal polarity.

22. A matrix converter according to claim 10, wherein from the generator m phases are forming the input of the first stage, wherein m/n phases are forming the output of the first stage, wherein groups of n, preferably adjacent, output phases of the first stage are connected, and wherein each of the thus formed m/n conductors (13) is connected with each of the bidirectional switches (4) of a corresponding group (12) of the grid stage (9) of the converter.

23. A matrix converter according to claim 22, wherein the groups of n output phases of the first stage are adjacent to each other.

24. An electrical machine according to claim 14, wherein said matrix converter plane is realistic above the housing.

* * * * *